United States Patent
Miette

(10) Patent No.: US 8,046,308 B2
(45) Date of Patent: Oct. 25, 2011

(54) METHOD OF PROCESSING POSTAL ITEMS WITH ACCOUNT BEING TAKEN OF EXTRA EXPENSE DUE TO WRONG DELIVERY

(75) Inventor: Emmanuel Miette, Saint-Gratien (FR)

(73) Assignee: Solystic, Gentilly (FR)

(*) Notice: Subject to any disclaimer, the term of this patent is extended or adjusted under 35 U.S.C. 154(b) by 929 days.

(21) Appl. No.: 10/529,755

(22) PCT Filed: Feb. 3, 2004

(86) PCT No.: PCT/FR2004/050038
§ 371 (c)(1),
(2), (4) Date: Mar. 30, 2005

(87) PCT Pub. No.: WO2005/064508
PCT Pub. Date: Jul. 14, 2005

(65) Prior Publication Data
US 2006/0085093 A1    Apr. 20, 2006

(30) Foreign Application Priority Data
Dec. 24, 2003  (FR) ..................................... 03 51199

(51) Int. Cl.
*G06K 9/00* (2006.01)
*G06Q 30/00* (2006.01)
(52) U.S. Cl. ................... 705/337; 705/401; 382/101
(58) Field of Classification Search ........... 705/401; 382/101; 235/375; 209/535, 584; 700/224; 707/3
See application file for complete search history.

(56) References Cited

U.S. PATENT DOCUMENTS

| 2,031,223 | A | * | 2/1936 | Mellen ................................ 30/44 |
| 5,031,223 | A | * | 7/1991 | Rosenbaum et al. ......... 382/101 |
| 5,042,667 | A | * | 8/1991 | Keough ........................ 209/3.1 |
| 5,287,271 | A | * | 2/1994 | Rosenbaum ...................... 705/8 |
| 5,703,783 | A | * | 12/1997 | Allen et al. ................... 209/584 |
| 5,734,568 | A | * | 3/1998 | Borgendale et al. ......... 700/224 |
| 6,269,171 | B1 | * | 7/2001 | Gozzo et al. .................. 382/101 |
| 6,520,407 | B1 | * | 2/2003 | Nieswand et al. ............ 235/375 |
| 6,829,369 | B2 | * | 12/2004 | Strebel et al. ................. 382/101 |

(Continued)

FOREIGN PATENT DOCUMENTS

EP    0 584 607 A    3/1994

(Continued)

OTHER PUBLICATIONS

Michael Maguire, The 10 immutable laws of postal address quality, Sep. 2001, Quality Publishing, Inc., pp. 1-6.*

*Primary Examiner* — John Hayes
*Assistant Examiner* — Brian Epstein
(74) *Attorney, Agent, or Firm* — Sughrue Mion, PLLC

(57) ABSTRACT

A method of processing postal items in which an image is formed of each item, the image including address information (1), and on the basis of the image of the item and a reference address base (6), OCR is used to perform automatic recognition of the destination address information (8, 9), is characterized in that during automatic recognition of destination address information, use is made (10) of a database (11) in which there are organized ordered lists of delivery points for delivery rounds in such a manner as to take account of an estimated extra cost for destination error associated with processing the item should the item be delivered to an erroneous delivery point.

3 Claims, 4 Drawing Sheets

U.S. PATENT DOCUMENTS

| | | | |
|---|---|---|---|
| 7,031,959 B2* | 4/2006 | Garner et al. | 707/3 |
| 7,095,875 B2* | 8/2006 | Rundle et al. | 382/101 |
| 7,181,045 B2* | 2/2007 | Vollmann | 382/101 |
| 7,529,716 B1* | 5/2009 | Welsh | 705/401 |
| 7,745,755 B2* | 6/2010 | Madar et al. | 209/584 |
| 2002/0125177 A1* | 9/2002 | Burns et al. | 209/630 |
| 2002/0143464 A1* | 10/2002 | Blewitt | 701/202 |
| 2002/0172399 A1* | 11/2002 | Poulin et al. | 382/101 |
| 2002/0186864 A1* | 12/2002 | Rundle et al. | 382/101 |
| 2003/0078802 A1 | 4/2003 | Yonezawa | |
| 2003/0085162 A1* | 5/2003 | Daniels et al. | 209/584 |
| 2003/0182017 A1* | 9/2003 | O'Donohue et al. | 700/224 |
| 2004/0024716 A1* | 2/2004 | Malatesta et al. | 705/410 |
| 2004/0064326 A1* | 4/2004 | Vaghi | 705/1 |
| 2004/0065598 A1* | 4/2004 | Ross et al. | 209/584 |
| 2004/0118907 A1* | 6/2004 | Rosenbaum et al. | 235/375 |
| 2005/0196014 A1* | 9/2005 | Vollmann | 382/101 |
| 2006/0081511 A1* | 4/2006 | Pippin | 209/584 |

FOREIGN PATENT DOCUMENTS

| | | |
|---|---|---|
| WO | WO 02/41186 A | 5/2002 |
| WO | WO 03/086664 A | 10/2003 |

* cited by examiner

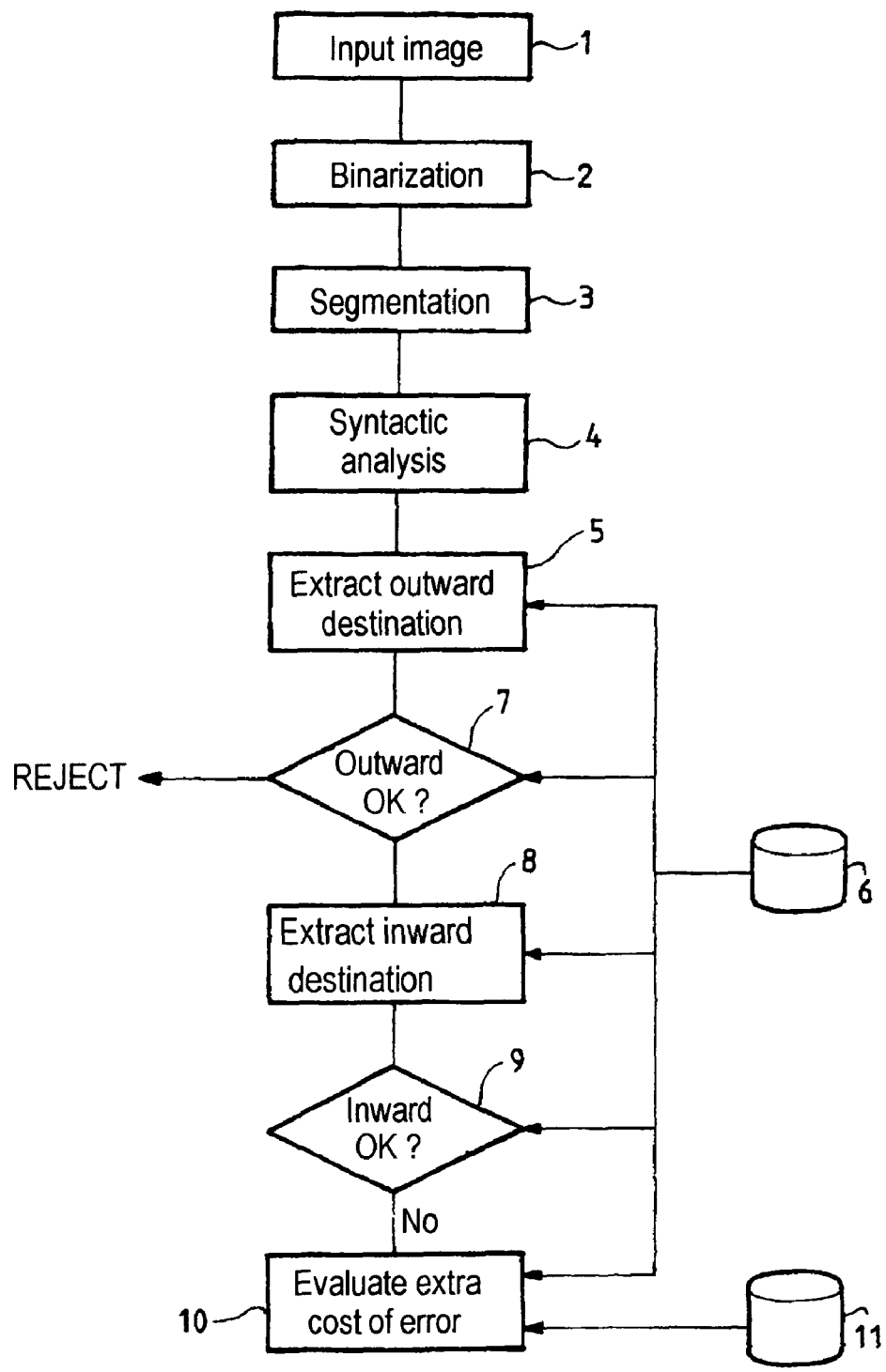

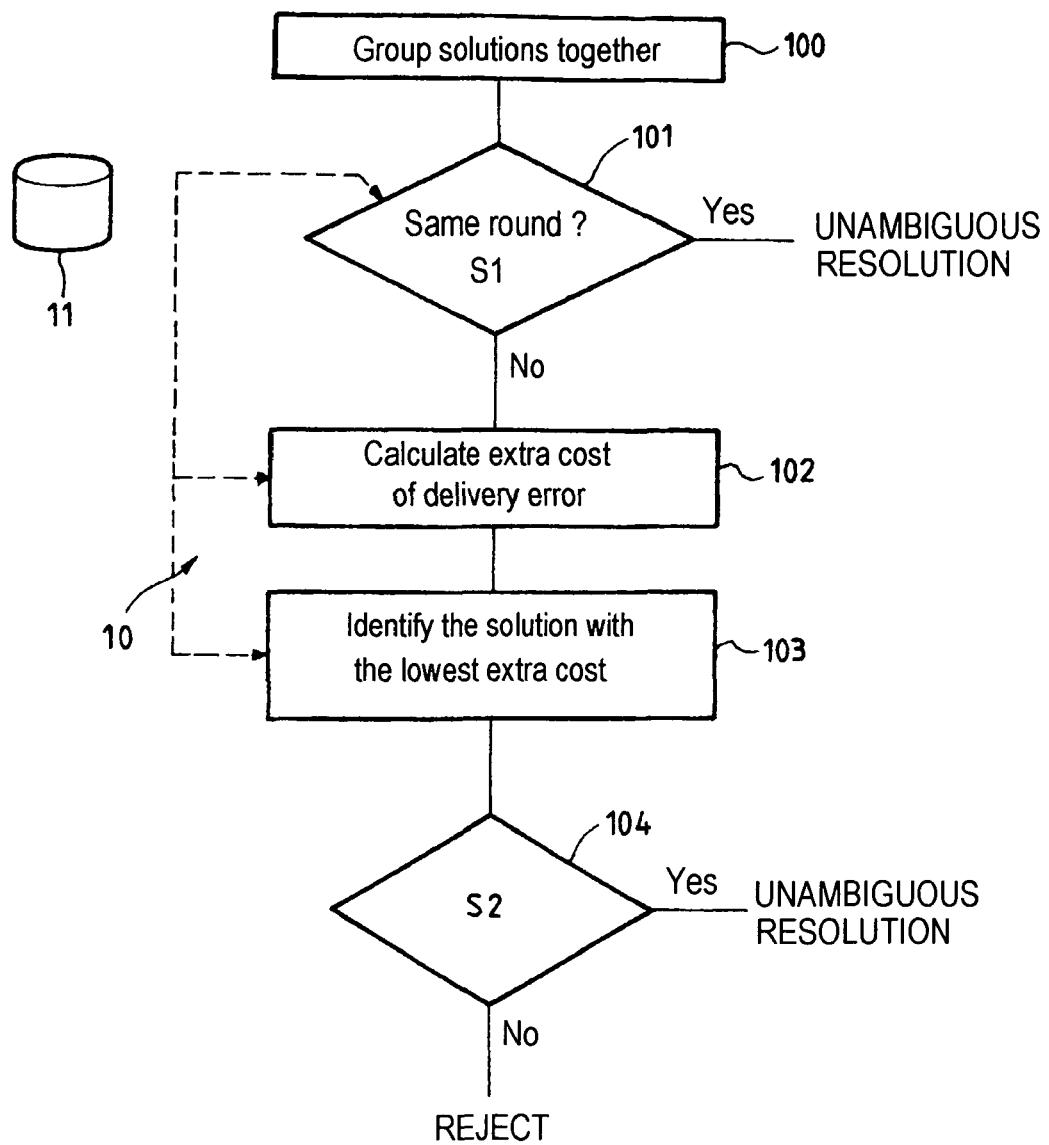

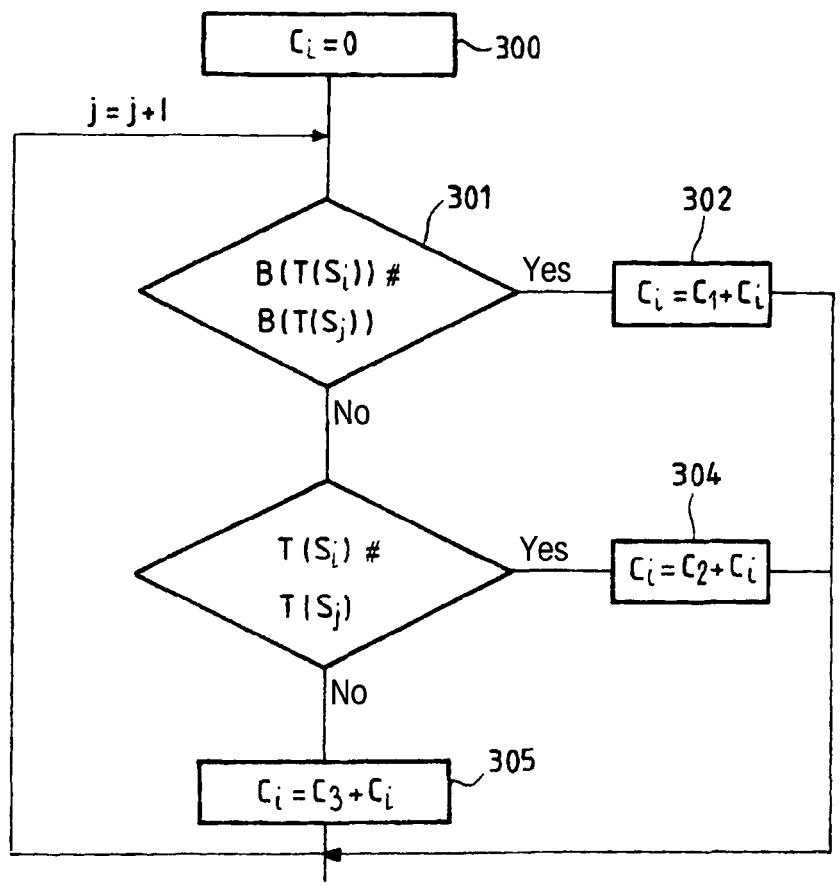
FIG_3
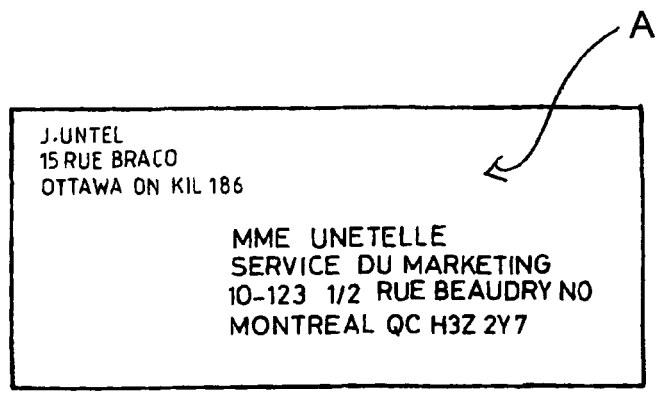
FIG_5

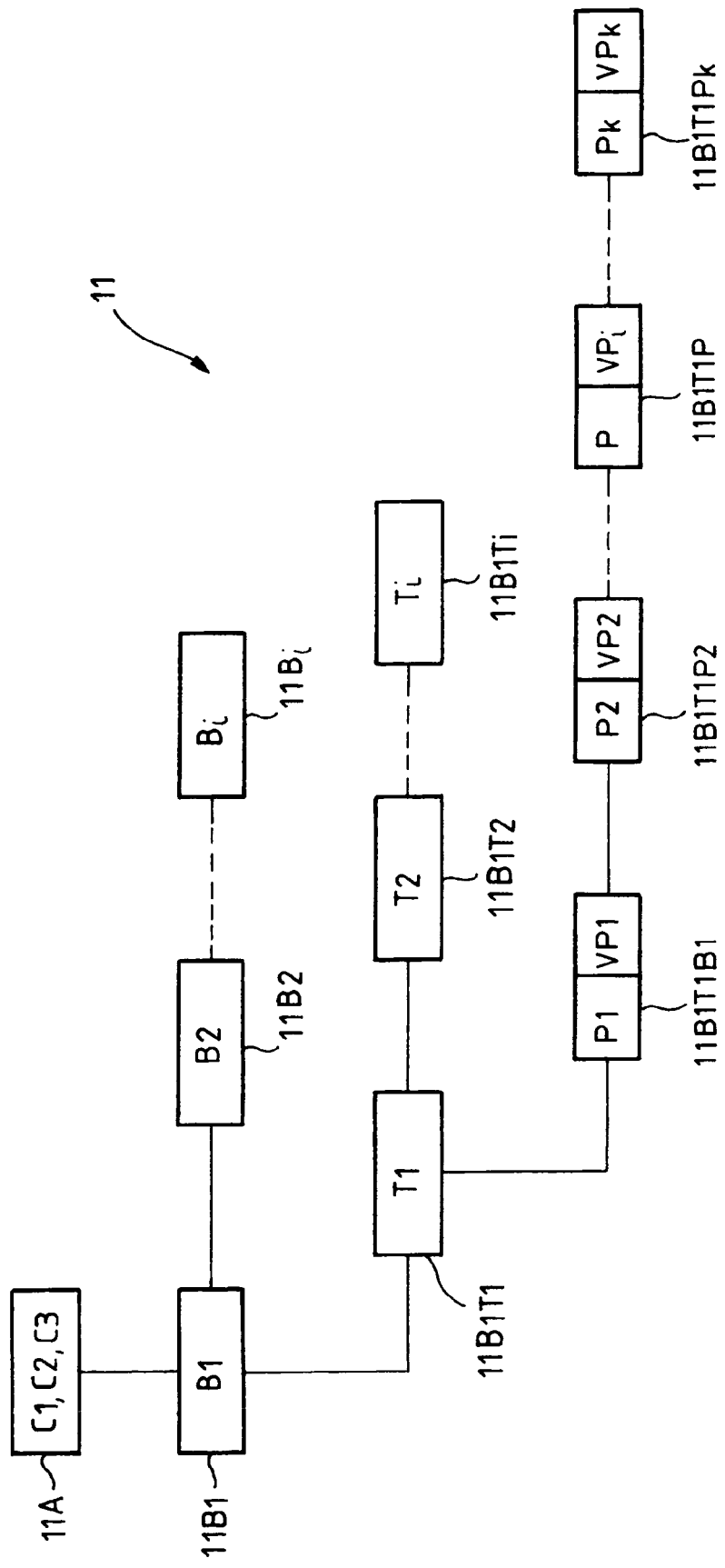

METHOD OF PROCESSING POSTAL ITEMS WITH ACCOUNT BEING TAKEN OF EXTRA EXPENSE DUE TO WRONG DELIVERY

BACKGROUND OF THE INVENTION

The invention relates to a method of processing postal items in which an image is formed of each item, and including its address information, and on the basis of the image of the item and a reference address base, automatic optical character recognition (OCR) is performed on the destination address information.

Postal operators have undertaken a considerable standardization effort towards defining addressing standards and encouraging the use of such standards. Although standardized mail addressing is becoming more and more widespread, and constitutes a large proportion of postal items handled, there nevertheless remains a very large amount of the mail that is handled that has addressing that is not standard and that includes errors, ambiguities, or indeed from which information is missing.

It is known that systems for automatically recognizing postal addresses by OCR operate so as to obtain an unambiguous resolution for the address for the purposes of sorting within a postal delivery round or "postman's" walk. This recognition operation is performed with an adjustable error rate that has an influence on the extent to which an unambiguous resolution is found, and as a result, on a batch of items, there will be some that are set aside by the automatic recognition process because of the ambiguous result of the resolution. Such items that are set aside or rejected by the automatic recognition processing need to be taken up by a video coding station and/or to be inserted manually into delivery rounds. The proportion of items that are set aside by an automatic OCR process defines a rejection rate at a level that is set on the error level fixed by the postal operator and on the basis of which the error rate is set.

Automatic recognition of address information requires detailed knowledge of the structure of the address block and the style rules used by the clients of postal operators. In order to enable an unambiguous resolution to be found based on a postal directory or on a reference address base, the postal address for recognition must have all of its components placed in an order that is correct, logical, and matches the reference address base.

A destination address typically comprises a street name, a number in the street, a town name, a post code, and a country.

Automatic OCR on a postal item conventionally comprises a plurality of successive steps:

- forming a digital image of the postal item including the address information;
- binarizing the digital image of the item that includes address information;
- segmenting the binarized image in order to locate the address block;
- analyzing the address block syntactically in order to subdivide it into address components (strings of characters allocated to different address headings (street number, street name, post code, town, door number, company, country, etc. . . . ); and
- analyzing the address components semantically by comparison with the reference address base (postal directory) in order to obtain an unambiguous resolution.

In the last step of resolving the address, a choice is made from a set of potential address solutions, selecting that address which has the best statistical match with the reference address base. This step of resolving the address is generally subdivided into a step of resolving outward addressing information (country, town, post code) and a step of resolving inward addressing information (street number, street name, door number, etc. . . . ). In both of these two resolution steps, a search is made for a statistical match between the reference address base and a destination address solution is issued when the statistical match level is greater than a predetermined statistical threshold as defined by the error rate. Otherwise, the item is set aside by the automatic recognition processing, as mentioned above.

SUMMARY OF THE INVENTION

The object of the invention is to propose a method of processing postal items that is improved so as to be capable of lowering the rejection rate for a predetermined error rate. In particular, the invention seeks to optimize the degree of unambiguous resolution by taking account of the incidences of item classification errors in delivery rounds.

To this end, the invention provides a method of processing postal items in which an image is formed of each item, the image including address information, and on the basis of the image of the item and a reference address base, OCR is used to perform automatic recognition of the destination address information, the method being characterized in that during automatic recognition of destination address information, use is made of a database in which there are organized ordered lists of delivery points for delivery rounds in such a manner as to take account of an estimated extra cost for destination error associated with processing the item should the item be delivered to an erroneous delivery point.

The idea on which the invention is based stems from the observation that a postal operator can accept classification errors of items in a delivery round insofar as the extra cost of processing associated with such classification errors does not exceed a determined level. For example, the content of a postman's bag is organized as a function of the delivery travel direction. This organization defines an order relationship between the item delivery points that make up the round. In any one round, items that are wrongly classified can have little or no effect on the person following the round. Such classification errors can therefore be tolerated to some extent by the postal operator. For example, classification errors can be tolerated when the address information is of quality that is not sufficient for unambiguous resolution. In a conventional method of automatically processing postal items, poor quality address information is generally not resolved unambiguously and the corresponding items are therefore set aside by the automatic address recognition process. With the method of the invention, prior to setting such items aside, an attempt is made to classify them, i.e. to determine a delivery point for each item, while accepting that there can be a certain level of classification error which amounts to increasing the error rate and reducing the rejection rate of the automatic recognition process.

In a particular implementation of the method of the invention, following an ambiguous resolution of the destination address of an item, taking account of the extra cost of destination error consists in grouping together a set of destination address solutions for the item, in identifying delivery points corresponding respectively to said solutions, and in looking to see whether the identified delivery points form part of a single delivery round.

It can easily be seen that a classification error concerning a delivery round generally represents a small volume of mail and is therefore not very penalizing for the postal operator. Thus, when the identified delivery points are all part of the same delivery round, taking account of the extra cost of destination error consists in determining a volume of mail in the delivery range corresponding to the identified delivery point for said round. If this volume is below a predetermined threshold set by the postal operator, it is possible, for example, to select as the solution for unambiguous resolution, the destination address solution that corresponds to the first delivery point in the delivery range.

In a particular implementation of the method of the invention, taking account of the extra cost of destination error consists in grouping together a set of destination address solutions for the item, in identifying delivery points corresponding respectively to said solutions, in identifying delivery rounds corresponding respectively to said delivery points, and in identifying delivery offices corresponding respectively to said delivery rounds, and on the basis of the delivery points, the delivery rounds, and the delivery offices as identified in this way, in searching amongst the destination address solutions for that solution which minimizes the extra cost of destination error associated with processing the item in the event of it being delivered by a wrong delivery office, and/or in a wrong delivery round, and/or to a wrong delivery point.

In another particular implementation of the method of the invention, a first item of numerical information is defined representative of an extra cost for destination error associated with processing an item if it is delivered by an erroneous delivery office, a second item of numerical information is defined representative of an extra cost of destination error associated with processing an item if it is delivered in an erroneous delivery round, and a third item of numerical information is defined representative of an extra cost of destination error associated with processing an item if it is delivered to an erroneous delivery point. In order to seek the solution that minimizes the extra cost of destination error, a comparison is made for each current solution for the destination address between the delivery office and/or the delivery round, and/or the delivery point identified for said solution with the delivery office, the delivery round, and the delivery point identified for each of the other destination address solutions so as to obtain for said current destination address solution an accumulated value of extra costs of destination error calculated on the basis of said first, second, and third items of numerical information.

The invention also provides a system for processing postal items, the system comprising a camera for forming an image of each item, the image including address information, and a data processor unit that performs automatic recognition of destination address information by OCR on the basis of the image of the item and a reference address base, the system being characterized in that it further comprises a database having organized therein ordered lists of delivery points for delivery rounds, and in that the processor unit is arranged in such a manner that during automatic recognition of destination address information, it makes use of said database in such a manner as to take account of an estimated extra cost of destination error associated with processing the item should it be delivered to an erroneous delivery point.

This processor system may present the following features:

the processor unit is arranged in such a manner that in order to take account of the extra cost of destination error, it groups together a set of destination address solutions for the item, it identifies the delivery point corresponding respectively to said solutions, and it seeks to discover whether the identified destination points all form part of a single delivery round;

the processor unit is arranged in such a manner that in order to take account of the extra cost of destination error, in the event of all the identified delivery points being part of a single delivery round, it determines a volume of mail in the delivery range corresponding to the delivery points identified for said delivery round;

the processor unit is arranged in such a manner that in order to take account of the extra cost of destination error it groups together a set of destination address solutions for the item, it identifies the delivery points corresponding respectively to said solutions, it identifies the delivery round corresponding respectively to said delivery points, and it identifies the delivery offices corresponding respectively to said delivery round, and on the basis of the delivery point, the delivery round, and the delivery offices as identified, it searches the destination address solutions for the solution that minimizes the extra cost of destination error associated with processing the item should it be delivered by an erroneous delivery office, and/or in an erroneous delivery round, and/or to an erroneous delivery point; and there are recorded: a first item of numerical information representative of the extra cost of destination error associated with processing an item if it is delivered to an erroneous delivery office, a second item of numerical information representative of the extra cost of destination error associated with the processing of an item if it is delivered in an erroneous delivery round, and a third item of numerical information representative of the extra cost of destination error associated with processing an item if it is delivered to an erroneous delivery point, and in order to search for the solution that minimizes the extra cost of destination error, the processing unit is arranged in such a manner as to compare for each current destination address solution the delivery office and/or the delivery round and/or the delivery point identified for said solution with the delivery office, the delivery round, and the delivery point identified for each of the other destination address solutions in such a manner as to obtain for said current destination address solution an accumulated value of extra cost of destination error as calculated on the basis of said first, second, and third items of numerical information.

BRIEF DESCRIPTION OF THE DRAWINGS

An implementation of the method and a system of the invention is described in greater detail below with reference to the drawings.

FIG. 1 is a simplified flow chart showing how an automatic operation of address recognition by OCR is performed in accordance with the invention.

FIG. 2 is a simplified flow chart showing an example of the process of taking account of the extra cost of destination error associated with processing the item if it is delivered to an erroneous destination point.

FIG. 3 is a simplified flow chart of another example of the process of taking account of an extra cost of destination error associated with processing the item if it is delivered to an erroneous destination point.

FIG. 4 is a highly diagrammatic representation of the structure of the database in which ordered lists of destination points for delivery rounds are organized.

FIG. 5 is an image of a postal item including destination address information.

DETAILED DESCRIPTION OF THE INVENTION

In FIG. 1, an operation of automatically recognizing a destination address by OCR (i.e. a delivery address) on a postal item begins in a step 1 by using a camera (not shown) to input the image of the item, which image includes the delivery postal address for the item.

FIG. 5 is an image of a postal item having destination address information in an address block A.

The image is then binarized in step 2.

The binarized image is then segmented in step 3 to extract the address block.

The information contained in the address block is analyzed syntactically in step 4 to extract therefrom, in step 5, outward address information by matching with data in the reference address base 6.

This extraction step 5 can provide a set of outward address solutions which are grouped together and evaluated in a step 7 by matching with data recorded in the reference address base 6 until an unambiguous resolution is obtained of the outward address information.

If an unambiguous resolution cannot be obtained, then the item is set aside (REJECT) from the automatic recognition process. Otherwise, the inward address information is subsequently extracted in a step 8 by performing a new syntactical analysis of the information contained in the address block in association with the reference address base 6, which provides a set of inward address solutions.

In a step 9, the inward address solutions are grouped together and evaluated in association with the reference address base 6 until an unambiguous resolution is obtained of the inward address information.

As mentioned above, with a conventional automatic address recognition process, if there is no unambiguous resolution for the inward address information, then the item is set aside or rejected from the automatic recognition process.

In the invention, if an unambiguous resolution of the inward address information cannot be obtained, then the automatic process for inward address recognition is continued in a step 10 by making use of the database 11 that has organized therein ordered lists of destination points for delivery rounds so as to be able to take account of an estimated extra cost for destination error associated with processing the item if it is delivered to an erroneous destination point. An ordered list of delivery round destination points should be understood as a list comprising the set of destination points in a delivery round in the order followed by the person doing the round.

It should be understood at this point that steps 2 to 10 are implemented by a data processor unit that can be in the form of a network of a plurality of computers. The database 11 and the reference address base 6 form part of the processing unit.

FIG. 2 shows the various steps of a process 10 in accordance with the invention for taking account of the extra cost of destination error.

In 100, the address solutions obtained at 9 or a superset of those address solutions are grouped together, and the delivery points corresponding respectively to said inward address solutions are identified, e.g. using the reference address base 6, which generally contains this type of information.

In step 101, a search is made to see whether the delivery points identified in step 100 do or do not form part of a single delivery round, by making use of the database 11, where FIG. 4 shows an example of one possible structure for said database.

With reference to FIG. 4, the database 11 is represented in the form of records organized as lists of lists.

The head of the database 11 is a record 11A identifying a sorting office, for example.

This head record 11A points to an ordered list of records 11B1, 11B2, 11Bi identifying delivery offices for the sorting office.

Each record 11B, such as 11B1, points to an ordered list of records 11B1T1, 11B1T2, 11B1Ti identifying the delivery rounds T1, T2, Ti for the delivery office in question, in this case 11B1.

Each record 11BT, such as 11B1T1, points to an ordered list of records 11B1T1P1, 11B1T1P2, 11B1T1Pi, 11B1T1Pk identifying destination points P1, P2, Pi, Pk for the corresponding round of the corresponding delivery office.

In each record identifying a delivery point of a round there is recorded information VP1, VP2, VPi, VPk representative of a volume of mail for each destination point of the round. The items of information VP1, VP2, etc. . . . can be mean values for postal volume, known to the postal operator.

In FIG. 2, in step 101, if all of the delivery points identified in step 100 are part of a single round, e.g. round T1 of delivery office B1, then the volume of mail in the delivery range corresponding to the destination points identified for the round is calculated. The delivery range is defined by the two extreme delivery points in the set of destination points identified in step 100 in the ordered list of destination points in the round. If i and k are the indices for the extreme delivery points, then the volume of mail in the delivery range is defined by the following relationship:

$$V = \sum_{j=i \text{ to } k} (VP_j)$$

In step 101, the calculated value V is compared with a threshold value S1 that is adjustable by the postal operator, and if V is less than S1, then for an unambiguous resolution of the destination address, the solution is selected that corresponds to the first delivery point in the delivery range, i.e. the solution corresponding to the delivery point VPi when referring to the above relationship. This threshold value S1 can be adjusted by the postal operator to avoid accepting an error in classification of the item in a delivery round that has a large volume of mail.

Otherwise, the item can either be set aside from the automatic recognition processing (REJECT) or else the processing of the invention can be refined by continuing in step 102 to calculate a delivery extra cost associated with processing the item if it is delivered in error to a wrong delivery office and/or to a wrong round and/or to a wrong delivery point. It should be observed that continuing with step 102 can be authorized also if the set of all the delivering points identified in step 100 do not form part of the same round, as determined in step 101.

The detail of step 102 is shown in FIG. 3.

In FIG. 3, $C_1$, $C_2$, and $C_3$ are numerical data items each representing extra cost of destination error associated with processing an item if it is delivered respectively to a wrong delivery office, to a wrong delivery round, or to a wrong delivery point.

In an simplified implementation of the method of the invention, $C_1$, $C_2$, and $C_3$ may be numerical values that can be adjusted and that are previously defined by the postal operator.

In FIG. 3, $C_i$ designates the accumulated extra cost of delivery calculated for a current address solution of index i.

In step 300, the accumulated value $C_i$ is initialized to a value zero.

In step 301, if the delivery office B of the round T identified for the current address solution referenced $S_j^{s^i}$ is different from the delivery office B for the round T identified for a subsequent address solution in the set of solutions identified in step 100, in this case referenced $S_j$, then accumulated extra cost value for the destination error $C_i$ is increased by the value $C_1$ as indicated in block 302 and the process returns to step 301 for a new, subsequent address solution.

If step 301 has the opposite outcome, then a search is made in step 303 to find out whether the round T identified for the current address solution $S_i$ is different from the round T identified for the subsequent address solution $S_j$. If so, then the accumulated value for the extra cost of destination error $C_i$ is increased by the value $C_2$ as shown in process block 304, and the process returns to step 301 for a new, subsequent address solution.

Otherwise, the accumulated value of the extra cost of destination error is increased in step 305 by the value $C_3$, and the process returns to step 301 for a new, subsequent address solution.

At the end of steps 300 to 305, an accumulated value is obtained for the extra cost of destination error $C_i$ for the current address solution $S_i$ amongst the set of address solutions.

The process in steps 300 to 305 is repeated for each other address solution in the set of address solutions determined in step 100, each being used as the current address solution for the process.

At the end of the process containing steps 300 to 305, the process block 102 receives as many accumulated values $C_i$ for the extra cost of destination error as there are address solutions determined in step 100.

In step 103 of FIG. 2, the address solution is identified for which the accumulated value of the extra cost $C_i$ of destination error is the smallest.

In treatment block 104, if this accumulated value $C_i$ is less than the previously-recorded threshold value S2 that can be set by the postal operator, then this address solution is the solution used for the unambiguous resolution. Otherwise, the item is set aside (REJECT) by the automatic recognition processing. The threshold value S2 serves to set aside an address solution for unambiguous resolution that presents an extra cost for destination error that is prohibitive for the postal operator.

The method of the invention can be further refined in precision by selecting as the numerical information $C_1$ representative of an extra cost for error associated with processing an item if it is delivered by a wrong delivery office, a matrix of values $C_{i,j}$ in which each value is representative of an extra cost for destination error between two particular delivery offices.

An example of a matrix for the numerical information $C_1$ could be as follows for four delivery offices B1, B2, B3, and B4:

|    | B1        | B2        | B3        | B4        |
|----|-----------|-----------|-----------|-----------|
| B1 | 0         | $C_{1,2}$ | $C_{1,3}$ | $C_{1,4}$ |
| B2 | $C_{2,1}$ | 0         | $C_{2,3}$ | $C_{2,4}$ |
| B3 | $C_{3,1}$ | $C_{3,2}$ | 0         | $C_{3,4}$ |
| B4 | $C_{4,1}$ | $C_{4,2}$ | $C_{4,3}$ | 0         |

The numerical information $C_2$ and $C_3$ can be refined in the same manner as the numerical value $C_1$. Instead of a matrix of values, it is possible for the numerical information $C_3$ in step 305 to use a polynomial that takes account of the relative difference between two delivery points in a given round. An example of a polynomial for the information $C_3$ may be as follows:

$$C_3 = ABS(C_4(i-j)) + C_5$$

where i and j are respectively the ranks of delivery points in a given round corresponding to the current address solution $S_i$ and to the subsequent address solution, and where $C_4$ and $C_5$ are constants.

The numerical information $C_1$, $C_2$, and $C_3$ can be recorded in suitable records of the database 11 of the system for automatically recognizing addresses by OCR.

The method of the invention thus makes it possible to introduce four levels of risk or error in obtaining an unambiguous resolution for the destination address.

A first level is introduced when a classification error is made between two delivery offices.

A second level is introduced when the classification error is made between two rounds within the same delivery office, where this classification error will require the item to be delivered a second time.

A third level is introduced when the classification error takes place within a given delivery round. This classification error will generally be discovered by the postman or woman when delivering the mail.

Finally, the fourth level corresponds to the level used conventionally by systems for automatically recognizing addresses by OCR.

Naturally, the system of the invention for processing postal items can form part of a postal sorting machine having sorting outlets suitable for preparing delivery rounds.

The invention claimed is:

1. A method for optimizing a process for automatically recognizing a destination address of a postal item, comprising the steps of:
   forming a digital image of said postal item including a destination address for said item;
   performing address resolution processing from said image and a postal directory, via OCR processing in a data processing unit, for providing an unambiguous delivery point corresponding to said destination address if said resolution is unambiguous and several possible ambiguous delivery points if said resolution is ambiguous; and
   upon determining, by said address resolution processing, several possible ambiguous delivery points, detecting from a database coupled to said processing unit that said several possible ambiguous delivery points are included in a single delivery round, said single delivery round being defined into said database by several ordered delivery point records each containing mail volume data; and
   in response to said detection, computing, via said processing unit and from said mail volume data, a mail volume value for a delivery range in said delivery round, said delivery range being defined by two extreme delivery points among said possible ambiguous delivery points within said delivery round, and providing a resulting delivery point which corresponds to said destination address if said mail volume value is less than a predetermined volume threshold, said resulting delivery point being a first one of said two extreme possible ambiguous delivery points.

2. A postal address recognition system for automatically recognizing a destination address of a postal item, comprising:
   a camera for forming a digital image of said postal item including a destination address for said item;
   a database wherein delivery rounds are defined each by several ordered delivery point records, each delivery point record containing mail volume data; and data processing means designed for
  a) performing address resolution processing from said image and a postal directory, via OCR, for providing an unambiguous delivery point corresponding to said destination address if said resolution is unambiguous and several possible ambiguous delivery points if said resolution is ambiguous; and
  b) upon determining, by the address resolution processing, several possible ambiguous delivery points, detecting from said database that said several possible ambiguous delivery points are included in a single delivery round;
  c) in response to said detection, computing from said mail volume data a mail volume value for a delivery range in said delivery round, said delivery range being defined by two extreme delivery points among said possible ambiguous delivery points within said delivery round, and providing a resulting delivery point which corresponds to said destination address if said mail volume value is less than a predetermined volume threshold, said resulting delivery point being a first one of said two extreme possible ambiguous delivery points.

3. A postal sorting machine comprising:
a camera for forming a digital image of said postal item including a destination address for said item;
a database wherein delivery rounds are defined each by several ordered delivery point records, each delivery point record containing mail volume data; and
data processing means designed for
  a) performing address resolution processing from said image and a postal directory, via OCR, for providing an unambiguous delivery point corresponding to said destination address if said resolution is unambiguous and several possible ambiguous delivery points if said resolution is ambiguous;
  b) upon determining, by the address resolution processing, several possible ambiguous delivery points, detecting from said database that said several possible ambiguous delivery points are included in a single delivery round;
  c) in response to said detection, computing from said mail volume data a mail volume value for a delivery range in said delivery round, said delivery range being defined by two extreme delivery points among said possible ambiguous delivery points within said delivery round, and providing a resulting delivery point which corresponds to said destination address if said mail volume value is less than a predetermined volume threshold, said resulting delivery point being a first one of said two extreme possible ambiguous delivery points; and
a sorting mechanism for sorting said postal item in accordance with said resulting delivery point.

\* \* \* \* \*